(12) United States Patent
Kalbag et al.

(10) Patent No.: US 8,804,666 B2
(45) Date of Patent: Aug. 12, 2014

(54) METHOD AND DEVICE FOR PROVIDING INTER-DOMAIN HANDOFF CONFIGURATION INFORMATION TO A DUAL MODE ACCESS TERMINAL

(75) Inventors: Rohit Satish Kalbag, Bridgewater, NJ (US); Robert Martin Ephraim, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 64 days.

(21) Appl. No.: 13/490,167

(22) Filed: Jun. 6, 2012

(65) Prior Publication Data

US 2012/0327899 A1 Dec. 27, 2012

Related U.S. Application Data

(62) Division of application No. 11/889,104, filed on Aug. 9, 2007, now Pat. No. 8,249,016.

(51) Int. Cl.
*H04W 4/00* (2009.01)

(52) U.S. Cl.
USPC ........ 370/331; 370/310.2; 370/328; 370/338; 370/401; 455/432.1; 455/461; 455/466; 455/352

(58) Field of Classification Search
USPC .............. 370/331, 310.2, 328, 338, 389, 401, 370/469, 352; 455/432.1, 432.2, 461, 455/552.1, 433, 466
See application file for complete search history.

(56) References Cited

U.S. PATENT DOCUMENTS

| 7,136,651 | B2 | 11/2006 | Kalavade | |
| 7,522,921 | B2* | 4/2009 | Thompson | 455/433 |
| 7,778,630 | B2* | 8/2010 | Ho et al. | 455/417 |
| 8,340,711 | B1* | 12/2012 | Glass et al. | 455/552.1 |
| 2004/0264410 | A1* | 12/2004 | Sagi et al. | 370/331 |
| 2005/0141456 | A1 | 6/2005 | Shaheen | |
| 2006/0083199 | A1* | 4/2006 | Yang | 370/331 |
| 2006/0099935 | A1* | 5/2006 | Gallagher et al. | 455/414.1 |
| 2006/0105766 | A1* | 5/2006 | Azada et al. | 455/432.1 |
| 2006/0114885 | A1* | 6/2006 | Baek et al. | 370/352 |
| 2006/0135157 | A1* | 6/2006 | Baek et al. | 455/433 |
| 2006/0154665 | A1 | 7/2006 | Svensson et al. | |
| 2006/0217112 | A1 | 9/2006 | Mo | |

(Continued)

OTHER PUBLICATIONS

Entire Prosecution of U.S. Appl. No. 11/889,104 to Kalbag, et al., filed Aug. 9, 2007, entitled, "Method and Device for Providing Inter-Domain Handoff Configuration Information to a Dual Mode Access Terminal".

A.B. Roach, "Session Initiation Protocol (SIP)—Specific Event Notification," Network Working Group, RFC 3265, Jun. 2002.

J. Rosenberg et al., "SIP: Session Initiation Protocol," The Internet Society, Network Working Group, RFC 3261, Jun. 2002.

(Continued)

*Primary Examiner* — Andrew Lai
*Assistant Examiner* — Andrew C Lee

(57) ABSTRACT

A dual mode Access Terminal (AT) is operable to communicate both in a Circuit Switched (CS) network domain and an Internet Protocol (IP) Multimedia Subsystem (IMS) network domain. Up-to-date handoff configuration information is transmitted from an IMS server to the AT during a registration of the dual mode AT with an IMS network or during establishment of a call session of AT. The handoff configuration information is used in a call handoff of an ongoing call of the AT between the CS network and the IMS network. In the examples, the handoff configuration information includes a handoff number for use in a handoff to the Circuit Switched (CS) network and a handoff Uniform Resource Identifier (URI) for use in a handoff to the IMS network.

12 Claims, 6 Drawing Sheets

(56) References Cited

U.S. PATENT DOCUMENTS

| | | | |
|---|---|---|---|
| 2006/0286980 A1* | 12/2006 | Hua | 455/435.1 |
| 2006/0286984 A1* | 12/2006 | Bonner | 455/445 |
| 2007/0015535 A1 | 1/2007 | LaBauve et al. | |
| 2007/0049281 A1 | 3/2007 | Chen et al. | |
| 2007/0060124 A1 | 3/2007 | Kalavade | |
| 2007/0060196 A1* | 3/2007 | Sharma | 455/552.1 |
| 2007/0135146 A1* | 6/2007 | Rezaiifar et al. | 455/466 |
| 2007/0281704 A1* | 12/2007 | Lin et al. | 455/445 |
| 2007/0297373 A1* | 12/2007 | Saifullah et al. | 370/338 |
| 2008/0004007 A1* | 1/2008 | Kallio | 455/432.2 |
| 2008/0013533 A1* | 1/2008 | Bogineni et al. | 370/389 |
| 2008/0032695 A1* | 2/2008 | Zhu et al. | 455/442 |
| 2008/0080480 A1* | 4/2008 | Buckley et al. | 370/352 |
| 2008/0101291 A1* | 5/2008 | Jiang et al. | 370/331 |
| 2008/0152123 A1* | 6/2008 | Pazhyannur et al. | 379/373.01 |
| 2008/0259885 A1* | 10/2008 | Faulkner et al. | 370/338 |

OTHER PUBLICATIONS

M. Garcia-Martin et al., "Private Header (P-Header) Extensions to the Session Initiation Protocol (SIP) for the 3rd-Generation Partnership Project (3GPP)," Network Working Group, RFC 3465, Jan. 2003.

J. Rosenberg, "A Presence Event Package for the Session Initiation Protocol (SIP)," Network Working Group, RFC 3856, Aug. 2004.

ARIB STD-T63-23.206 V7.1.0; Voice Call Continuity (VCC) between Circuit Switched (CS) and IP Multimedia Subsystem (IMS); Stage 2 (Release 7); 3rd Generational Partnership Project, 2006.

3GPP TR 23.806, V7.0.0 (Dec. 2005), 3rd Generational Partnership Project; Technical Specification Group Services and System Aspects; Voice Call Continuity between CS and IMS Study (Release 7).

"IP Multimedia Subsystem," Wikipedia, accessed May 11, 2007.

P. Resnick, editor, "Internet Message Format," QUALCOMM Incorporated, Network Working Group, RFC 2822, Apr. 2001.

* cited by examiner

METHOD AND DEVICE FOR PROVIDING INTER-DOMAIN HANDOFF CONFIGURATION INFORMATION TO A DUAL MODE ACCESS TERMINAL

RELATED APPLICATION

This application is a divisional of U.S. application Ser. No. 11/889,104 filed Aug. 9, 2007 the disclosure of which is incorporated herein by reference.

BACKGROUND

Early wireless communication was performed in circuit switched (CS) networks, such as Code Division Multiple Access (CDMA) and Global System for Mobile Communications (GSM), with a communication channel dedicated to each call. With the rapid growth of the Internet, technological advances in packet data networks have yielded a packet-based voice communication such as Voice over IP (VoIP). VoIP services are now migrating onto the packet transport networks deployed for the wireless domain such as Wireless Fidelity (WiFi), Worldwide Interoperability for Microwave Access (WiMAX), Wideband Code Division Multiple Access (W-CDMA), High-Speed Downlink Packet Access (HSPDA), and the like.

Internet Protocol based multimedia services are provided over the IMS network and the IMS network includes but is not limited to Wireless Local Area Network (WLAN), CDMA2000, a WiFi and Fixed line. The IMS network supports Voice Over IP (VOIP) service.

A popular advantage of wireless communications is the freedom of mobility. To support mobile communication, the wireless networks perform a function called "handoff." Handoff, (or handover), is the process by which elements of a mobile network pass a cellular phone conversation or data session from one radio channel in one cell to another radio channel in another cell. It is performed so quickly that callers do not notice. Handoff, unlike roaming, involves moving an active call from one radio to another radio. Roaming involves registering for service/access through different locations on various regional networks, as a mobile station user moves.

In CDMA cellular telecommunication systems, a handoff is usually accomplished via a "soft handoff" between sectors or from one base station to another base station. In a soft handoff between base stations, for example, the mobile station is in communication with more than one base station simultaneously, and thus the mobile station performs a "make before break" transition from one base station to another base station. The soft handoff is possible because in CDMA cellular telecommunication systems, numerous mobile stations communicate with each base station on the same frequency channel, each mobile station having a unique spreading code for distinguishing the information signals broadcast by the numerous mobile stations. Thus, when a mobile station moves from one CDMA cell to another CDMA cell, the same frequency is used in each CDMA cell and the unique spreading code identifies the mobile station to the new base station.

However, when it becomes necessary to handoff between systems, e.g. between systems of different service providers or between systems using different technologies (e.g. between CDMA and AMPS, TDMA or GSM systems), a "hard handoff" occurs. The hard handoff is a "break before make" connection. The hard handoff may be necessary because the available frequency channels or the encoding technologies used in the two adjoining systems differ, and thus when a mobile station moves from one to another, a new frequency channel or coding technique must be implemented.

While handoff of an ongoing call allows a network customer to receive and make calls without interruption during moving, handoff was generally restricted to handoff within the CS network type or within the VoIP network type. From a user's perspective, however, the need to handoff an active call is not limited to handoff between networks of a particular network type.

The deployment of wireless IP network creates a need for a handoff function to handover an active call from one network type to another network type, because it is beneficial to system performance to handoff Access Terminals (ATs) from the CS network to the IP Multimedia Subsystem (IMS) network or from the IMS network to the CS network. For example, the channel conditions associated with one network may be more favorable than the channel conditions associated with the other network due to such factors as fading, adjacent and co-channel interference, and available power at a serving base station (BS). In addition, an operator of both the IMS network and the CS network may desire to move the ATs from one network to the other network for purposes of balancing of system loading or reducing infrastructure costs. Moreover, the AT user wants to handoff his call from the CS network to the IMS network, while roaming or because calling charge in the IMS network is cheaper than in the CS network.

To meet a demand for handoff between heterogeneous networks, Third Generation Partnership Project (3GPP) proposes a standard for handoff of voice call between the CS network and the IMS network in 3GPP TR 23.806. Dual mode ATs which support both the CS network communication and the IMS network communication are introduced as well.

3GPP TR 23.806 requires the dual mode ATs to support voice over both the CS network and the IMS network. To support voice over both networks, the dual mode ATs need to retain handoff configuration information to request a handoff of an ongoing call from the CS network to the IMS network or vice versa. The configuration information includes a Handoff Number (HO Number) which is a public telecommunication number used to handoff an ongoing IP based call from the IMS network to the CS network, and a Handoff Uniform Resource Identifier (HO URI), used to handoff an ongoing call from the CS network to the IMS network.

Several ways to provide HO Number and HO URI to the dual mode ATs have been offered. As one option, the HO Number and HO URI are preconfigured and stored in the dual mode ATs before their distribution to customers. However, the pre-configuration has several shortcomings. When the HO Number or URI for the dual mode ATs change e.g. due to splits of Number Plan Administrators (NPAs), it is necessary to reconfigure HO Numbers and HO URIs programmed the dual mode ATs have to obtain new HO Numbers such reprogramming typically is complex, and it may be difficult to so reconfigure all affected ATs in a timely manner. Moreover, this approach cannot handle regional differences of the HO Numbers and the HO URIs.

Another approach is a configuration of HO Numbers and HO URIs by an adjunct system separate from both CS and IMS network systems. This approach also has a number of drawbacks. First, assignment of the HO Numbers and the HO URIs does not reflect the current load or preferences of VoIP switches serving the dual mode ATs. Second, handoff may be performed based on incorrect HO Numbers and HO URIs which were obtained from the last communication of an AT with the adjunct system, because at the time of a particular call handoff the AT may not yet store correct configuration information depending upon the frequency of communication with the adjunct system. Third, the ATs may be required to support a new protocol to communicate with the adjunct system.

Hence a need exists for a method and a system of providing call handoff configuration information to dual mode ATs, without preconfiguration and/or without need of the adjunct system for assignment of call handoff information.

Another need exists for providing correct call handoff configuration information reflecting any recent change of the information. Still another need exists for providing call handoff configuration information to dual mode ATs using a pre-existing IMS network system, e.g., without the need to deploy an additional adjunct device or the like to update the handoff information.

BRIEF DESCRIPTION OF THE DRAWINGS

The following detailed description of the embodiments of the present disclosure can best be understood when read in conjunction with the following drawing figures that depict concepts by way of example, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, known methods, procedures, components, and circuitry have been described at a relatively high-level, without detail, in order to avoid unnecessarily obscuring aspects of the present teachings.

The present concepts are applicable to a variety of different circuit switched (CS) wireless networks with and without support for packet data communications services, such as Global System for Mobile Communications (GSM)/General Packet Radio Service (GPRS), Universal Mobile Telecommunications System (UMTS), etc., as may be implemented in a variety of different frequency bands. Those skilled in the art will recognize applicability to other types of networks, including packet only wireless networks such as WiFi, Wireless Local Area Network (WLAN) and Evolution-Data Optimized (EVDO).

Figure 1:
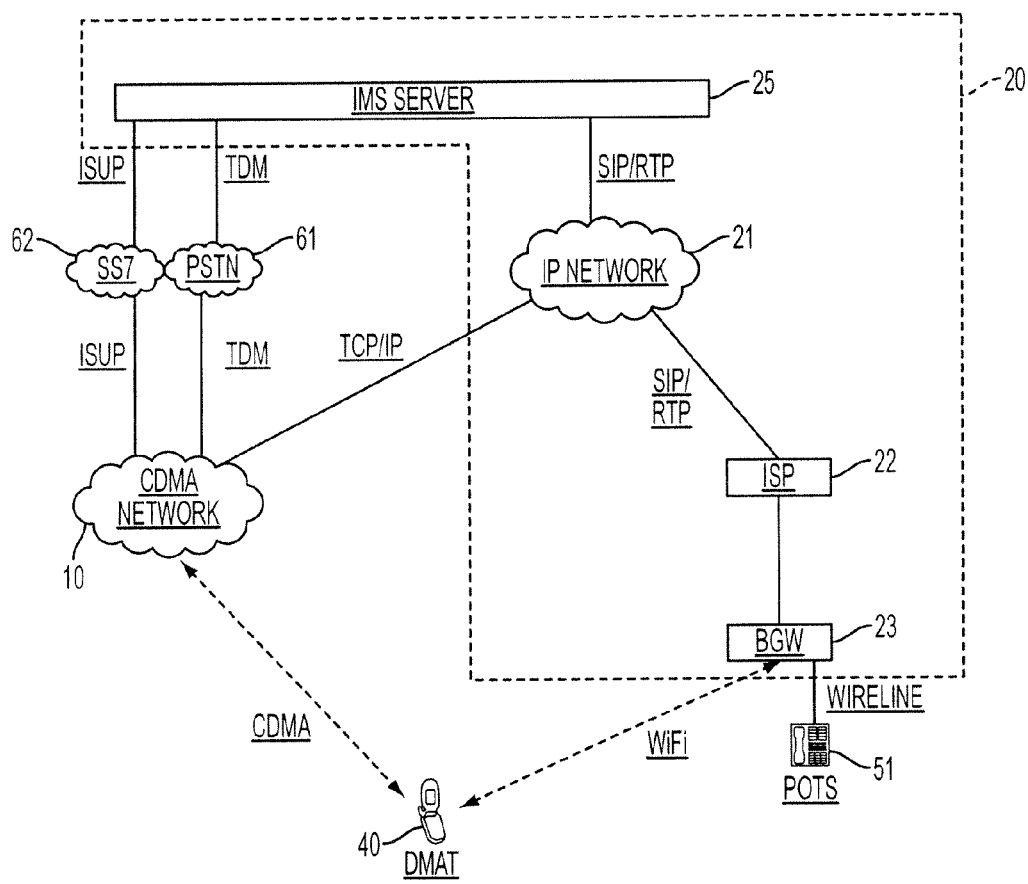
FIG. 1 illustrates an IP Multimedia Subsystem (IMS) network converged with a Circuit Switched (CS) network, where the networks support voice calls of a dual mode Access Terminal (AT) in both networks and attendant handoffs between the networks.

Reference now is made in detail to the examples illustrated in the accompanying drawings and discussed below. FIG. 1 illustrates a representative wireless Circuit Switched (CS) network 10, for example a CDMA network, connected to an IP Multimedia Subsystem (IMS) network 20, for example a WiFi network. However, the choice of CDMA and WiFi is by way of example only and should not be construed to limit the scope of the present invention.

Although the elements of the CS network 10 and the IMS network 20 are generally known, to ensure a full understanding of the examples, it may be helpful to consider the general structure and operation of the networks, before going into detail with regard to the inventive operations in that exemplary network. The CS network 10 and the IMS network 20 provide mobile voice telephone communications as well as packet data services, for numerous Access Terminals (ATs) 40.

The CS network 10 enables users of the ATs to initiate and receive telephone calls to each other as well as through the public switched telephone network (PSTN) 61 to landline telephone devices. The CS network 10 also enables subscribers of the ATs 40 to initiate and receive various data communications, for example to or from the public data network referred to as the Internet to send or receive data from other digital devices such as personal computers. The CS network 10 provides the various wireless communication services in accord with a digital radio protocol, although for voice telephone services, the network may support the legacy analog protocol as well.

The CS network 10 also communicates with an IP Multimedia Subsystem (IMS) server 25 which is a subpart of the VoIP system/IMS network. Such communications may use existing circuit switched network nodes, for example, the Public Switched Telephone Network (PSTN) 61 and an associated signaling system network. SS7 signaling 62 is used for packet switched data communication, in this case between the CS network 10 and the IMS server 25, e.g., in support of call set-up. SS7 packet switched signaling 62 dynamically assigns routes based on availability and "least cost" algorithms. An SS7 network typically is comprised of a series of interconnected network elements, such as switches, databases, and routing nodes. ISDN User Part (ISUP) of the SS7 protocol is utilized to establish trunks between switches through the associated PSTN.

Internet Protocol based multimedia services are provided over the IMS network 20 and the IMS network 20 includes but not limited to Wireless Local Area Network (WLAN), CDMA2000, a WiFi and Fixed line. The IMS network 20 supports Voice Over IP (VOIP) service and in this example provides voice calls in the wireless environment. The IMS network 20 includes an IP Multimedia Subsystem (IMS) server 25, an IP network 21, and Internet Service Provider (ISP) 22 and Broadband GateWay 23.

The IMS server 25 is an architectural framework, originally designed by the wireless standards body 3GPP, for delivering IP multimedia services to end users. It is a part of the vision for evolving mobile networks beyond GSM. The IMS server 25 delivers "Internet Services" over the IMS network 20 represented by General Packet Radio Service (GPRS), including but not limited to Wireless Local Area Network (WLAN), CDMA2000 and Fixed line.

The IMS server 25 adopts the Internet Protocol (IP) network 21 as carrier channel for controlling signaling and media transmission and adopts the Session Initiation Protocol (SIP) as call control signaling in order to ease the integration of the IMS with the Internet, as far as possible. The 3rd Generation Partnership Project (3GPP) has set forth specifications describing the architecture of the IMS and networking in TR 23.806 among others.

Figure 2:
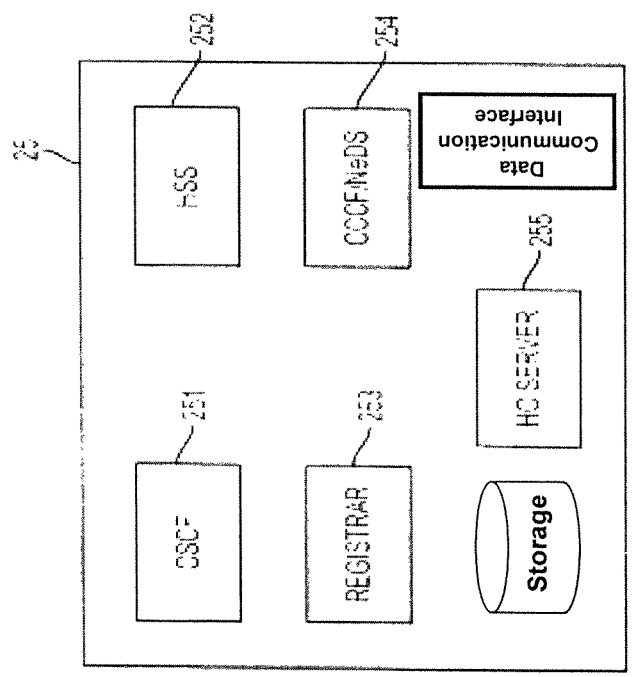
FIG. 2 is a functional/logical block diagram of an IMS Server.

Referring to FIG. 2, the IMS server 25 is an application server in the IMS network 20 which is a collection of different functions. Although other IMS server functions may be included, for this discussion, the IMS server functions include a Call Session Control Function (CSCF) 251 to process SIP signaling packet in the IMS network. The IMS 25 further includes Home Subscriber Server (HSS) 252 which contain subscribers' profiles and performs authentication and authorization of the subscribers, a registrar 253 to handle registrations of the ATs in the IMS network domain such as receiving and giving permissions to requests of registrations from the ATs, and Call Continuity Control Function/Network Domain Selection (CCCF/NeDS) 254 to control continuity between the IMS network 20 and the CS network 10. While the registrar 251 is described as a separate element from the CSCF 251, the registrar 251 may be implemented by being integrated with the CSCF 251. The Call Continuity Control Function/Network Domain Selection (CCCF/NeDS) 254 handles handoffs of ongoing calls between the CS network and the IMS network and keeps track of all calls originated from both networks. The IMS server 25 further includes Handoff (HO) server 255 which stores handoff configuration information for ATs. The HO server 255 allocates appropriate handoff configuration information to an AT which requests registration or requests establishment of call session with reference to subscribers' profiles stored in the HSS 252. While the HO server 255 is described as a separate element from the CCCF/NeDS 254, the HO server 255 may be implemented by being integrated with the CCCF/NeDS 254.

In the illustrated example, the IMS server 25 may be implemented using one or more hardware platforms intended to represent a general class of data processing device commonly used to run "server" programming so as to implement the functions discussed above. Such a device typically utilizes general purpose computer hardware to perform its respective server processing and to control the attendant communications via the network(s). Such a server, for example, includes a data communication interface for packet data communication. The server also includes a central processing unit (CPU), in the form of one or more processors, for executing program instructions. The server platform typically includes program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. The IMS server 25, for example, may be implemented as a set of server platforms separately programmed to perform one of more of the functions 251 to 255 or as single platform with programming for all of those functions. Of course, each such server or function may be implemented in a distributed fashion on a number of similar platforms throughout the IMS network 20, to distribute the processing load.

The Internet Service Provider (ISP) 22 allows the subscribers of the ISP 22 to access the IP network 21 via Broadband Gateway (BGW) 23. The BGW 23 serves as a WiFi Access Point (AP) for the dual mode ATs 40 and allows Plain Old Telephone System (POTS) users 51 to receive voice or data services from IMS network 20. The BGW 23 routes calls or data services to the subscribers of ATs 40 and POTS users 51 and the subscribers may share an IP address with each other. For the purposes of simplicity and clarity of the present discussion, it shall be assumed the BGW 23 is located at a home or office of the subscribers, or at some other place frequented by the subscribers.

Communications between ATs and nodes within the IMS network 20 utilize the Session Initiation Protocol (SIP). SIP is a signaling protocol for Internet conferencing, telephony, presence, events notification, instant messaging, and the like. SIP uses a long-term stable identifier, the SIP Uniform Resource Identifier (URI) and the SIP URI scheme is presented in RFC 3261. SIP protocol is employed to initiate and to modify a multimedia session over the internet protocol (IP) network. For example, SIP is used in a UMTS network to establish a multimedia session between two users wherein at least one of the users operates on the UMTS system. SIP can be regarded as the enabler protocol for telephony and voice over IP (VoIP) services.

SIP is a text-based protocol and uses the UTF-8 character set. A SIP message is either a request from a client to a server, or a response from a server to a client. Basic formats of both request and response messages are presented in RFC 2822.

The dual mode ATs 40 are WiFi enabled devices, and can access to the IP network 20 when the dual mode ATs 40 are within the coverage area of the BGW 23 serving as an access point of the WiFi. Outside the coverage area of the BGW 23 the dual mode ATs 40 communicate via the CS network 10.

A dual mode AT 40 requires a call handoff to implement seamless calling when it roams between the overlaying area of the CS network and the WiFi network during an active call. The dual mode AT 40 receives the HO Number and the HO URI from the IMS network 20. The HO Number and the HO URI are included in SIP response messages to SIP requests from the ATs 40. An AT 40 extracts and stores the HO Number and the HO URI for use in future call handoffs.

The dual mode AT 40 having the HO Number and HO URI performs handoff of a call originating from the IMS network domain to the CS network domain as follows.

Assume that a call exists through the BGW 23 and the IMS network. First, the Dual Mode AT 40 initiates a handover call leg in the "destination" CS network domain. Typically, this involves a call to a HO Number stored in the dual mode AT 40. Such calls to the HO Number are routed through the CDMA Network 10 to the IMS server 25. Upon receipt of the handoff call leg, the IMS server 25 drops the current call leg between the dual mode AT 40 and the IMS server 25 through the BGW 23, and substitutes the handoff call leg through the CDMA Network 10, such that the AT 40 is now connected via the handoff call leg to the remote user.

On the other hand, the dual mode AT 40 initiates handoff of a call originating from the CS network domain to the IMS network domain by placing a handoff call leg in the destination IMS network domain. The AT 40 places a call to a HO URI, and the call to the HO URI is routed through IP Network 21 to the IMS server 25. After receiving the handoff call leg, the IMS server 25 drops the current call leg between the AT and the IMS server 25 in the CS network domain and substitutes the handoff call leg for a call leg placed according to the HO URI.

The ATs 40 may take many forms. For example, some ATs may be enhanced mobile telephone stations with display and user input capabilities to support certain text and image communications, for example, for e-mail and web browsing applications. Although such ATs may have other form factors, today such ATs typically are in the form of portable handsets. Other ATs may comprise Portable Digital Assistants (PDAs) with built-in wireless communication capabilities. As another alternative, a wireless device such as a mobile telephone having data communication capabilities may be connected to a portable computing device such as a handheld or laptop type computer.

Figure 3:
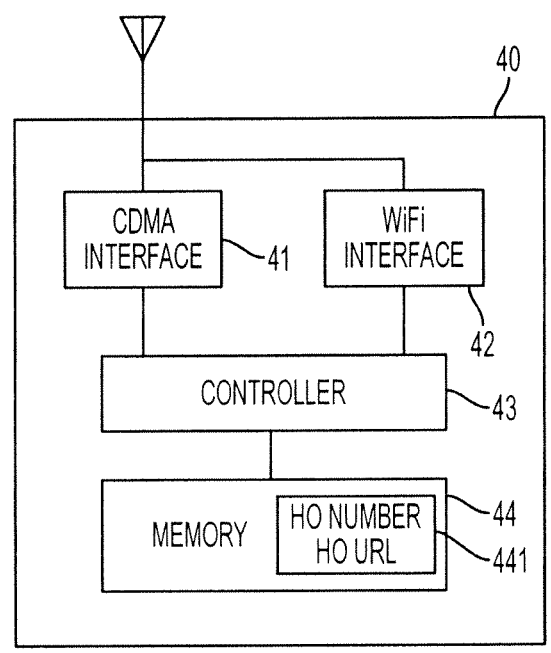
FIG. 3 is a simplified block diagram of a dual mode AT which supports a call session both in a CS network and an IMS network.

FIG. 3 illustrates selected functional elements of a dual-mode AT 40, which is capable of communicating both in the CS network 10 and the IMS network 20. In the illustrated embodiment, the dual-mode AT 40 comprises CDMA Interface 41, WiFi Interface 42, controller 43 and memory 44. The CDMA interface 41 and WiFi interface 42 interconnect the dual mode AT 40 with the CDMA network 10 and a WiFi network such as provided by BGW 23, respectively. The controller 43 controls functionalities including the registration request with the IMS server 25, the establishment of call session and handling handoff configuration information provided from the IMS server 25. The memory 45 stores handoff configuration information 451 including HO number and HO URI extracted by the controller 44 and employs the handoff configuration information during handoff of an ongoing call. When the dual mode AT 40 moves into the vicinity of an AP 23, the controller 43 activates the WiFi interface 42, which then scans for a WiFi beacon from the AP 23. The dual mode AT 40 places a call in the CDMA network by activating the CDMA interface 41. Other elements of the AT, e.g., to provide a user interface and/or voice input and output are omitted for simplicity. The above functions of the AT 40 are implemented as a software programmable in the memory 45 and executed by the controller 43.

Figure 4:
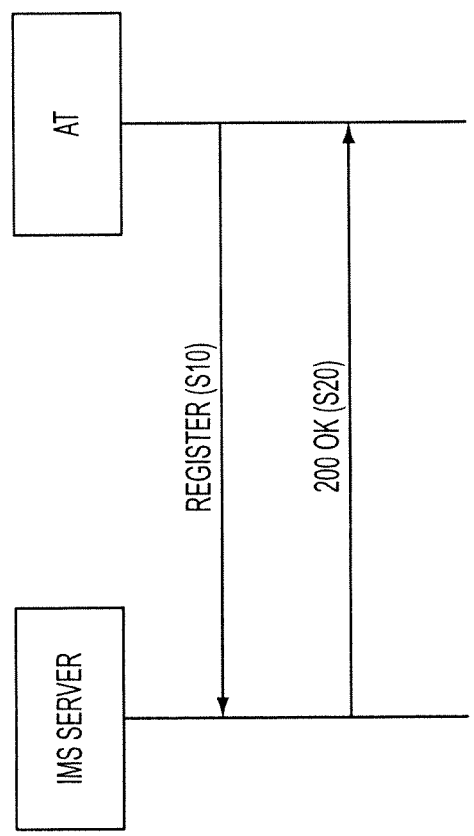
FIG. 4 illustrates a call flow for providing handoff configuration information to a dual mode AT in the course of a registration process of the dual mode AT with an IMS network.

Referring to FIG. 4, an example of providing handoff configuration information to the dual mode AT is described. When a user powers on the AT 40 or roams into the IMS network area, it needs to perform the initial registration so as to notify the IMS network 20 of the location of the AT 40 and to allow the IMS network to authenticate the AT. The dual mode AT 40 sends a SIP REGISTER request to the IMS network 20 through the WiFi node when the AT 40 is within a range of the access point, here the BGW 24 or the AT is power on (S10). The REGISTER request is forwarded to the IMS server 25 through the IP network 21.

The format of the SIP REGISTER request header fields is presented in RFC 3261. The SIP REGISTER request header fields contain identity information of the dual mode AT 40 requesting the SIP REGISTER and a contact header field which is used to convey a URI that identifies the request originator. This SIP URI can include the IP address of the AT where the user is reachable. The contact header field consists of SIP or SIP URIs that identify particular SIP endpoints, for example, "sip:carol@cube2212.verizon.com".

Assuming that the AT 40 is a valid station for IMS service, the IMS server 25 sends a 200 OK type response message to permit a registration of the AT 40 in the IMS network to the AT 40 in response to the SIP REGISTER request (S20). The IMS server 25 chooses a HO Number and a HO URI for the newly registering AT 40. The chosen handoff information can be based on various criteria, for example load balancing, regional proximity, etc. The IMS server 25 allocates the chosen HO Number and HO URI in the 200 OK response in form of P-Associated URI header.

P-Associated URI header is defined in RFC 3455. The P-Associated URI header allows the IMS server 25 to return a set of associated URIs for a registered address of record. The associated URI is a URI that the service provider has allocated to a user for his own usage. The IMS server 25 retains information that allows an address of record URI to be associated with URIs. The IMS server 25 inserts the P-Associated URI header field into the 200 OK response. The P-Associated URI header includes a SIP URI containing HO Number in the form of, for example, "sip:1-212-555-1234@ho.vzw.net; user=phone" and a SIP URI containing HO-URI in the form of, for example, "sip:handoff_1@houri.vzw.net". In the above example, the term "ho" in the SIP URI indicates that HO Number is "1-212-555-1234" and the term "houri" indicates that the HO URI is "handoff_1".

The dual mode AT 40 receives the 200 OK response, which is a response to the REGISTER request, from the registration server and extracts the P-Associated URI header from the 200 OK response. HO Number and HO URI are extracted or retrieved from the P-Associated URI header and are stored at location 441 in memory 44, for use to handoff an ongoing call in the future.

The process of registration of the AT 40 with the IMS network 20 is not establishing a call, but getting an authorization to be associated with the network where the AT 40 roams.

Thus, the subscriber's AT 40 receives handoff configuration information during the registration process with the IMS network 20 without need of adjunct devices by using existing IMS system, which allows subscribers of the ATs 40 to enjoy a "converged voice service" where the subscribers are reached by his or her telephone number regardless the network. Since existing SIP messages are used, there is no need to develop or support a new protocol for updating the AT configuration with new information.

Figure 5:
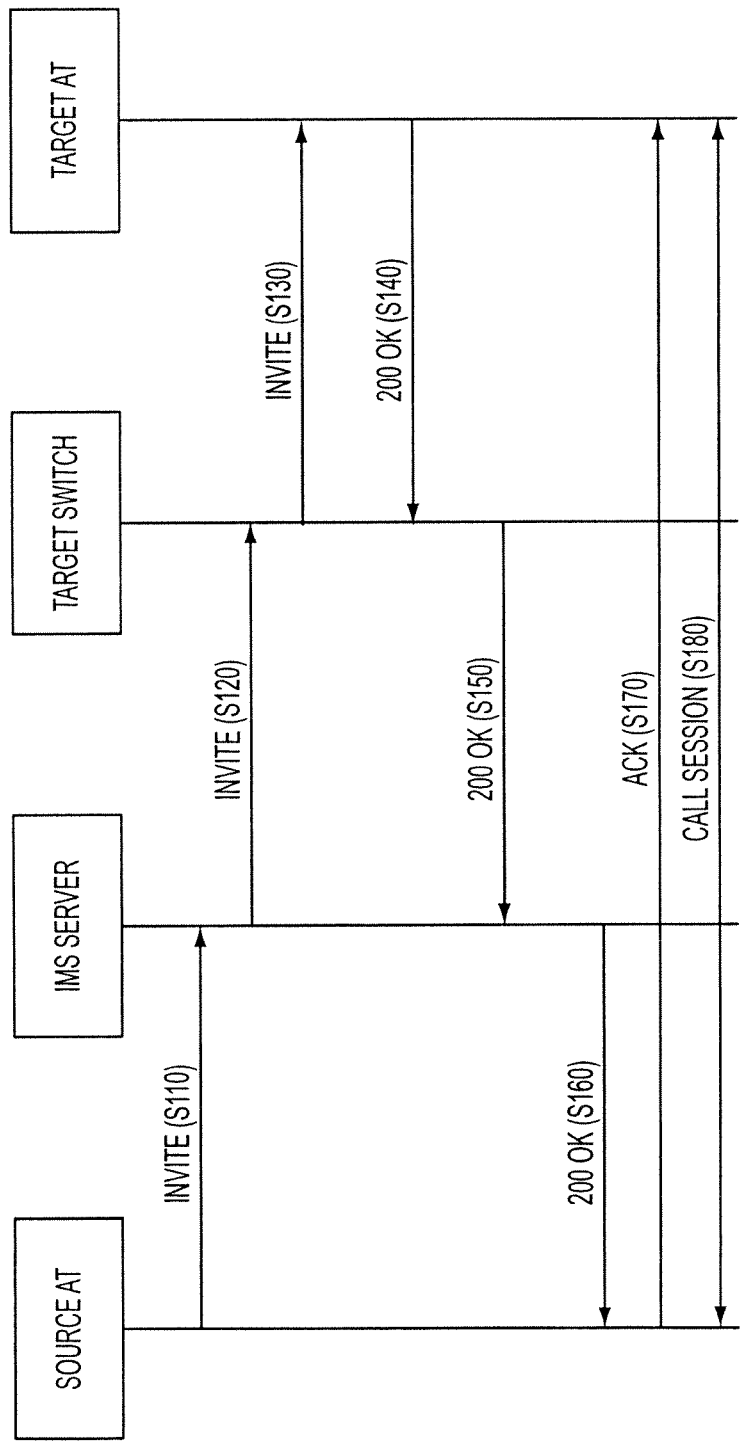
FIG. 5 illustrates a call flow for providing handoff configuration information to a dual mode AT from which a request of a call session originates.

Referring to FIG. 5, another example of providing handoff configuration information to a dual mode AT is described. FIG. 5 illustrates a call flow of a dual mode AT where a call session originates from the source AT which is located in the IMS network. The source AT is the calling party, and the target AT is the called party. The call flow sequence is from top to bottom in the figure. In the example, the target AT is in the CS or IMS network area and is an AT or any digital device which supports VoIP.

The first operation in the call flow occurs when the source AT sends a session INVITE message to the IMS server 25 which requests the IMS server 25 to establish a call session with the called party (S110). When the IMS server 25 receives the INVITE message, it sends the session INVITE message to a Target switch. (S120) The Target switch also forwards the INVITE message to the Target AT (S130). When the called party at the Target AT picks up the phone or activates its voice station, a 200 OK message is sent to the Target switch (S140). The Target switch passes the 200 OK message to the IMS server 25 (S150). The IMS server 25 forwards the 200 OK message to the Source AT (S160). The IMS server 25 inserted HO Number in the 200 OK messages sent to the Source AT at this step S160. The Source AT sends an acknowledgement (ACK) message back to the Target AT (S170). The call between the source and target is now established (S180).

The Target switch is a server to control a call session with the Target AT and is an IMS server when the Target AT is an AT in the IMS network domain and a CS server with an associated SIP gateway function when the Target AT is an AT in the CS network domain.

In this embodiment, HO Number and HO URI are provided to the source dual mode AT 40 by being inserted in the 200 OK message which the IMS server 25 forwards to the AT (at S160). The dual mode AT located in the IMS network to which HO Number is provided can perform handoff operation, since HO Number is used for handoff of an ongoing call which originates from the IMS network to the CS network. This embodiment along with the embodiment described below in the next two paragraphs provide an alternative to the embodiment of FIG. 4. The dual mode AT receives a HO Number and a HO URI as part of the establishment of a call session. Thus, this embodiment provides an opportunity to update the HO Number provided to the dual mode AT from which a call session originates whenever a new call session is established.

Figure 6:
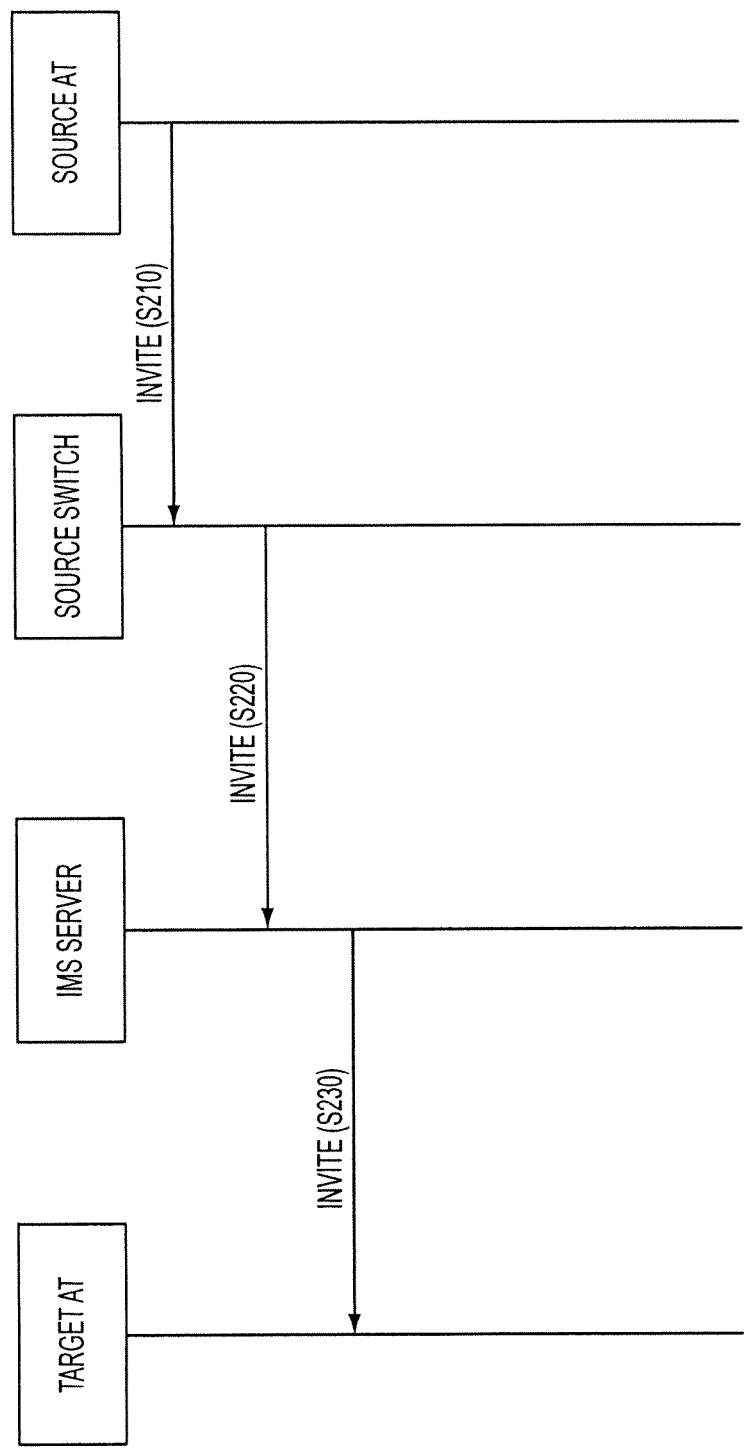
FIG. 6 illustrates a call flow for providing handoff configuration information to a dual mode AT at which a request of a call session terminates.

Referring to FIG. 6, another example of providing handoff configuration information to a dual mode AT is described. FIG. 6 illustrates a call flow of a dual mode AT where a call session terminates at a dual mode AT (target) located in the IMS network domain. In this example, the target AT is in the IMS network domain and the source AT is in the CS or the IMS network domain.

When a source AT wants to place a call to a target AT, the source AT sends a session INVITE message to a source switch which requests the source switch to establish a call session with the target AT. (S110) The source switch is an IMS mode, when the source AT is in the IMS network domain; and the switch is a CS switch with an associated SIP gateway function, when the source AT is in the CS network domain. When the source switch receives the INVITE message, it sends the session INVITE message to the IMS server 25. (S120) The IMS server 25 inserts HO Number and HO URI in the session INVITE message and forwards the INVITE message to the target AT (S130). The target AT receives and extracts the HO Number from the session INVITE message. The target AT gets an update of the HO Number whenever it receives a session INVITE message for a new incoming call, whether a call session is established or not in response to the session INVITE.

The construction of the INVITE message and 200 OK response is generally the same as that of the REGISTER request message and the 200 OK response in the registration process of FIG. 4. Since the HO Number and HO URI are sent to the calling AT and the called AT during establishment of the call session, the HO Number and the HO URI stored in the ATs are updated whenever the AT places and receives a call.

The ATs making or receiving new calls in the IMS domain extract and store the HO Number and HO URI included in the INVITE messages and the 200 OK responses in the embodiments of FIGS. 5 and 6, and such an AT can utilize the HO Number to handoff a call from the IMS network domain to the CS network domain 10.

In another embodiment, a feature code to perform a function, for example "Cancel Call Waiting", after handoff to the CS domain is provided to the dual mode phone together with the HO Number. "Call Waiting" allows mobile phone users to accept incoming calls while keeping an ongoing call connected. If a calling party places a call to a called party which is otherwise engaged, and the called party has the call waiting feature enabled, the called party is able to suspend the current telephone call and switch to the new incoming call, and can then negotiate with the new or the current caller an appropriate time to ring back if the message is important, or to quickly handle a separate incoming call. Since the signal to the called party is audible, "Call Waiting" often can cause annoyance to the ongoing call. For this reason, "Call Waiting" is often disabled on shared voice/data telephone lines when a data call originates. Mobile phone users can disable "Call Waiting" function for an outgoing call by prefixing the called number with some keys for example "*70".

In this embodiment, a dual mode AT user located in the IMS network domain pushes "*70" along with the dialed called party number to turn off "Call Waiting" function for that call. The IMS server 25 receives the feature code and determines that the feature is relevant to handoff in order to maintain the feature across domains. This determination may be carried out based on interaction with the CS wireless network or by other means. Thereafter, when the IMS server 25 provides the dual mode AT 40 with the HO Number as in the previous embodiments of FIGS. 5 and 6, the IMS server 25 supplies the feature code "*70" indicating "Cancel Call Waiting" to the dual mode AT 40 together with the HO Number by prefixing "*70" to the HO Number. When handoff of a call is performed, the dual mode AT places a call to the received HO Number. Since the code indicating "Cancel Call Waiting" is prefixed in the HO Number, the CS network receives the feature code with the HO Number from the AT. Hence, the "Call Waiting" function can be disabled after the dual mode AT 40 moves to the CS network domain. Thus, the "Cancel Call Waiting" function which is requested in the IMS network domain can be maintained even after the dual mode AT user moves to the CS network, without new entry of the keys requesting "Cancel Call Waiting."

In another embodiment, an applicability of handoff of a call is controlled based on the presence and absence of the handoff configuration information in signaling messages provided from the IMS server. The IMS server 25 may detect circumstances in which it would be inappropriate to handoff a call to another domain, such as when there is an incoming call waiting or when the access terminal is engaged in a multi-party call. If the IMS server 25 detects such circumstances, the IMS server will not provide the handoff configuration information in any signaling messages sent to dual mode ATs 40.

Thus, for example, when the "call waiting" is active for a dual mode AT 40 already being engaged in a call, and a call originating from another source AT is delivered to the dual mode AT 40, the IMS server 25 does not provide the handoff configuration information in the call INVITE message, since the "call waiting" is active. The dual mode AT 40 erases any previously stored handoff configuration information, if the newly received call INVITE message does not include handoff configuration information. As a result, handoff does not take place for the call. This will reduce the burden on the AT of dealing with a special situation where the handoff is inappropriate.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates to acronyms, as used in the detailed description above.

AP: Access Point
AT: Access Terminal
BGW: Broadband GateWay
BS: Base Station
CCCF/NeDS: Call Continuity Control Function/Network Domain Selection
CDMA: Code Divisional Multiple Access
CS: Circuit Switched
CSCF: Call Session Control Function
EVDO: Evolution-Data Optimized GSM: Global System for Mobile Communications
GPRS: General Packet Radio Service
HO: Handoff
HO Number: Handoff Number
HSPDA: High-Speed Downlink Packet Access
HO URI: Handoff Uniform Resource Identifier
HSS: Home Subscriber Server
IMS: IP Multimedia Subsystem
IP: Internet Protocol
ISP: Internet Service Provider
PDA: Personal Digital Assistant
POTS: Plain Old Telephone System
PSTN: Public Switched Telephone Network
RBGW: Residential Broadband Gateway
SIP: Session Initiation Protocol
UMTS: Universal Mobile Telecommunications System
URI: Uniform Resource Identifier
VoIP: Voice over IP
W-CDMA: Wideband Code Division Multiple Access
WiFi: Registered trademark of the Wi-Fi Alliance.
WiMAX: Worldwide Interoperability for Microwave Access
WLAN: Wireless Local Area Network
3GPP: Third Generation Partnership Project

What is claimed is:

1. A method for providing handoff configuration information to a dual mode access terminal (AT) located in an Internet Protocol (IP) Multimedia Subsystem (IMS) network, the handoff configuration information being for use in a call handoff of the dual mode AT between a circuit switched (CS) network and the IMS network, the IMS network including an IMS server for use in management of a call session of the dual mode AT, the method comprising:
 while the dual mode AT is located in the IMS network, sending an INVITE request for requesting a call session with a target AT from the dual mode AT to the IMS server;
 receiving, at the dual mode AT, from the IMS server a response message sent by the target AT, which authorizes an establishment of the requested call session, the response message including handoff configuration information for use in handing off calls of the dual mode AT between the CS network and the IMS network; and
 storing the received handoff configuration in the dual mode AT for future use,
 wherein the handoff configuration information includes:
  (1) a Handoff (HO) Number for use by the dual mode AT to implement a handoff of the dual mode AT from the IMS network to the CS network, and
  (2) a Handoff Uniform Resource Identifier (HO URI) for use by the dual mode AT to implement a handoff of the dual mode AT from the CS network to the IMS network.

2. The method of claim 1, further comprising:
 receiving the INVITE request sent by the dual mode AT at the IMS server;
 forwarding the received INVITE request to the target AT;
 receiving the response message at the IMS server from the target AT; and
 inserting the handoff configuration information in the response message for communication to the dual mode AT at the IMS server.

3. The method of claim 1, wherein the handoff configuration information is inserted in a P-Associated header or other standardized header of the response message.

4. A method for providing handoff configuration information to a dual mode access terminal (AT) located in the IMS network, the handoff configuration information being employed in a call handoff of the dual mode AT between a circuit switched (CS) network and an IP Multimedia Subsystem (IMS) network, the IMS network including an IMS Server for management of a call session of the dual mode AT, the method comprising:
 receiving an INVITE request for requesting a call session with the dual mode AT at the IMS server; and
 transmitting, while the dual mode AT is located in the IMS network, a corresponding INVITE request from the IMS server to the dual mode AT,
 wherein the corresponding INVITE request includes the handoff configuration for use in handing off calls of the dual mode AT between the CS network and the IMS network,
 wherein the handoff configuration information is:
  (1) a Handoff (HO) Number for use by the dual mode AT to implement a handoff of the dual mode AT from the IMS network to the CS network, and
  (2) a Handoff Uniform Resource Identifier (HO URI) for use by the dual mode AT to implement a handoff of the dual mode AT from the CS network to the IMS network.

5. The method of claim 4, wherein the handoff configuration information is inserted in a P-Associated header of the INVITE request.

6. A method for providing a feature code to perform a function to a dual mode Access Terminal (AT) located in an Internet Protocol (IP) Multimedia Subsystem (IMS) network as part of handoff configuration information for use in a call handoff of the dual mode AT between a circuit switched (CS) network and the IMS network, the dual mode AT being associated with an IP Multimedia Subsystem (IMS) server for use in management of a call session in the IMS network, the IMS server receiving the feature code from the dual mode AT, the method comprising:
 receiving, at the IMS server, the feature code from the dual mode AT in an INVITE request from the dual mode AT requesting a call session with a target AT while the dual mode AT is located in the IMS network;
 determining, at the IMS server and by interaction with the CS network, whether the feature is required to be performed by the CS network during handoff of the dual mode AT;
 providing, by the IMS server, handoff configuration information to the dual mode AT in a response message sent to the dual mode AT by the IMS network, the handoff configuration information including the feature code, when it is determined the feature is required to be performed by the CS network during handoff of the dual mode AT;
 performing handoff of the dual mode AT using the handoff configuration information; and
 performing the function corresponding to the feature code during and after handoff of the dual mode AT by employing the feature code included in the handoff configuration information,
 wherein the handoff configuration information is:
  (1) a Handoff (HO) Number for use by the dual mode AT to implement a handoff of the dual mode AT from the IMS network to the CS network, and
  (2) a Handoff Uniform Resource Identifier (HO URI) for use by the dual mode AT to implement a handoff of the dual mode AT from the CS network to the IMS network.

7. The method of claim 6, wherein the dual mode AT sends the feature code to the CS network when the dual mode AT initiates handoff of the dual mode AT from the IMS network to the CS network.

8. The method of claim 6, wherein the function is turning off call waiting for that call instance.

9. The method of claim 8, wherein the feature code is prefixed to the HO Number when the HO number is provided to the dual mode AT and dialed out by the dual mode AT when making the CS call.

10. A method for controlling handoff of a dual mode access terminal (AT) located in an IP Multimedia Subsystem (IMS) network or a circuit switched (CS) network, the handoff configuration information being employed in a call handoff of the dual mode AT between the CS network and the IMS network, the IMS network including an IMS Server for management of a call session of the dual mode AT, the method comprising:

providing the handoff configuration information to the dual mode AT;

detecting circumstances in which handoff of a call of the dual mode AT is unnecessary;

sending a signaling message to the dual mode AT, wherein based on the detecting of the circumstances, the signaling message does not provide the handoff configuration information to the dual mode AT; and deactivating the handoff operation at the dual mode AT in response to the signaling message not providing the handoff configuration information, wherein the handoff configuration information is:
  (1) a Handoff (HO) Number for use by the dual mode AT to implement a handoff of the dual mode AT from the IMS network to the CS network, and
  (2) a Handoff Uniform Resource Identifier (HO URI) for use by the dual mode AT to implement a handoff of the dual mode AT from the CS network to the IMS network.

11. The method of claim 10, wherein the circumstances include at least one of activation of call waiting and engaging in a multi-party call by the dual mode AT.

12. The method of claim 10, wherein the deactivation of handoff operation is performed by erasing the handoff configuration information previously provided to the dual mode AT.

* * * * *